UNITED STATES PATENT OFFICE 2,321,043

POLLEN ANTIGEN AND PROCESS OF PREPARING IT

George E. Rockwell, Cincinnati, Ohio, assignor to Eli Lilly and Company, Indianapolis, Ind., a corporation of Indiana No Drawing. Application July 2, 1941, Serial No. 400,797

5 Claims. (Cl. 167—78)

This invention relates to pollen antigens and processes of preparing them.

The compositions of this invention are pollen-tannate-antigens. These compositions are prepared by treating an extract of pollen with tannic acid. Preferably, prior to treating the extract with the tannic acid, the extract is adjusted so that the pH is less than the isoelectric point of the pollen antigen contained in the extract. The pollen treated is preferably that for which treatment is desired. It may be any pollen in the vegetable kingdom, for example, weed pollen such as from the giant ragweed, small ragweed, or plantain pollen, tree pollen, such as oak or elm pollen, and grass pollens, such as timothy, redtop, or June grass pollen, or it may be a mixture of pollens from different species. The tannic acid used may be derived from any source. An extract of the desired pollen or mixture of pollens, defatted if desired, is prepared by any of the usual methods. This extract is then subjected to the action of tannic acid. Preferably, the extract and tannic acid are sterilized by passing through a Seitz filter prior to the addition of the tannic acid to the extract. The amount of tannic acid required varies with the concentration of the extract, the temperature, type of acid used, and the buffer substances present in the extract. Desirably, an excess of acid is added. Sufficient tannic acid is added so that no precipitate forms in the filtrate upon the addition of more tannic acid. The application of heat tends to reduce the antigenicity of the pollen and for that reason it is desirable to maintain all temperatures in the process of producing the pollen-tannate-antigen below 37° C. and preferably lower. A precipitate forms and after a period of three hours to four days the excess acid and water are removed by any suitable means, such as by centrifugation, filtration, or decantation. The precipitate so produced is comminuted in a medium, such as normal physiological saline solution, in a sterile environment such, for example, as a sterile porcelain mill or a sterile mortar and pestle. Desirably, the pollen-tannate-antigen is reduced in size so that it passes through a 100-mesh sieve or is capable of passing freely through a 27-gauge needle. The mixture containing the antigen is then preferably adjusted to pH 6.0 and a preservative, such as sodium ethyl mercuri thiosalicylate or phenol, is added.

The pollen-tannate-antigen of this invention is desirably standardized on the basis of the weight of the original pollen used, the weight of the vacuum-dried antigen or the nitrogen content. Any one or all three of these criteria may be employed for the standardization.

Examples of the general process of this invention are as follows:

Example 1.—Ten grams of small ragweed pollen are mixed in 100 cc. of normal physiological saline solution containing sufficient alkali (e. g. sodium hydroxide) to make it definitely alkaline. The pollen is extracted for 48 hours in the ice box at a temperature of about 5° C. with occasional agitation. After extraction it is filtered through filter paper for clarity. The filtrate is then adjusted so that the pH is less than the isoelectric point of the pollen antigen as the precipitation with tannic acid is more rapid and complete if the pH of the filtrate is less than the isoelectric point of the pollen antigen. In the case of small ragweed pollen antigen the isoelectric point is 3.5 so the pH is adjusted to about 3.0. After adjusting to about pH 3.0 it is filtered through a Seitz filter for sterility, after which all subsequent handling is done under sterile conditions.

To the adjusted filtrate is added a sterile 10 percent tannic acid solution (Seitz filtered) in the proportion of 15 cc. to 100 cc. of filtrate. This is gently agitated and allowed to stand in the ice box at a temperature of about 5° C. for 48 to 72 hours with occasional agitation.

The precipitate is centrifuged and the supernatent fluid decanted. The precipitate is washed by adding 10 cc. of cold physiological saline solution (about 5° C.) and again centrifuged and the supernatent fluid decanted. The sediment is then taken up with 20 cc. of sterile physiological saline solution, transferred to a sterile mortar and pestle, and ground to the desired fineness. Sufficient sterile saline solution buffered with suitable salts, such as a mixture of sodium monobasic phosphate and sodium dibasic phosphate, at pH 6.0 and a water solution of sodium ethyl mercuri thiosalicylate (1:1,000 adjusted at pH 6.0) is added to bring it to the desired volume and concentration of sodium ethyl mercuri thiosalicylate.

This preparation is then standardized by one or more of the following methods: (1) nitrogen content (2) weight of precipitate (3) amount of the original pollen used.

Example 2.—Ten grams of an equal mixture of small and large ragweed pollen are added to 100 cc. of normal physiological saline solution, thoroughly mixed, and allowed to extract for 48 hours in the ice box at a temperature of about 5° C. with occasional agitation. After extraction, the mixture is filtered through filter paper for clarity and then filtered through a Seitz or Berkefeld filter for sterility, after which all subsequent handling is done under sterile conditions.

To the sterile filtrate is added a sterile 10 percent tannic acid solution in the proportion of 15 cc. of tannic acid to 100 cc. of filtrate. This mixture is gently agitated and allowed to stand in the ice box at a temperature of about 5° C. for about 72 hours with occasional agitation.

The precipitate is then centrifuged off and the supernatant fluid decanted. The sediment is then taken up with sterile physiological saline solution and ground to the desired fineness either in a sterile mortar and pestle or sterile porcelain ball mill.

The nitrogen content of the sterile pollen-tannate-antigen dispersion is diluted with sufficient physiological saline solution to bring it to the desired concentration. Sufficient phenol is then added to make a final concentration of one half percent phenol. Instead of standardizing the pollen-tannate-antigen by the nitrogen content, it may be standardized by one of the methods given under Example 1.

*Example 3.*—Ten grams of an equal mixture of the pollens from timothy, June grass, orchard grass, and redtop are extracted in 100 cc. of normal physiological saline solution to which has been added sufficient alkali (e. g. sodium hydroxide) to make the reaction neutral or slightly alkaline. This mixture is allowed to extract for 48 hours in the ice box at a temperature of about 5° C. with occasional agitation. After extraction the mixture is filtered through filter paper for clarity. Four cc. of concentrated hydrochloric acid (37 percent) are then added to the filtrate which is thoroughly mixed and allowed to stand in an ice box for one hour. Fifteen cc. of freshly made 10 percent tannic acid are then added. The hydrochloric acid not only sterilizes the antigen but also adjusts the reaction for better precipitation with tannic acid. Other mineral acids, such as nitric acid and sulfuric acid, may be used for this purpose, but hydrochloric acid is preferred. This mixture is then allowed to stand in the ice box at a temperature of about 5° C. from 3 to 72 hours, after which the precipitate is removed by centrifugation, washed with 10 cc. of sterile cold physiological saline solution, vacuum dried, ground in a sterile mortar and pestle, and stored in sterile sealed vials in the ice box.

To prepare the suspension for use, the determined amount of the dry sterile pollen-tannate-antigen is weighed out aseptically and then placed in a sterile mortar and ground in a few cc. of sterile physiological saline solution and finally diluted to the desired volume with sterile physiological saline solution. Phenol is added to a concentration of one half percent or sodium ethyl mercuri thiosalicylate to a concentration of 1:10,000. The pH may be adjusted to 6.0.

For example, if it is desired to prepare a suspension equivalent to 30,000 Noon units, enough of the dried pollen-tannate-antigen to be equivalent to .192 mg. of nitrogen would be required which in turn would require 1.92 mg. of the dried pollen-tannate-antigen per cc. of physiological saline solution.

All of the preparations as described in Examples 1, 2, and 3 are cultured for sterility and are inoculated into mice to insure against the presence of any toxic factors.

What is claimed is:

1. A pollen antigen comprising the reaction product of a pollen and tannic acid.

2. A pollen antigen comprising the reaction product of a ragweed pollen and tannic acid.

3. The process of producing pollen-tannate-antigen which comprises treating an extract of a pollen with tannic acid.

4. The process of producing a pollen-tannate-antigen which comprises adjusting an extract of pollen to a pH less than the isoelectric point of the pollen antigen contained in said extract and treating the adjusted extract with tannic acid.

5. The process of producing a pollen-tannate-antigen which comprises sterilizing an extract of pollen with a mineral acid and treating the sterilized extract with tannic acid.

GEORGE E. ROCKWELL.